(12) United States Patent
Kimpara et al.

(10) Patent No.: US 11,781,701 B2
(45) Date of Patent: Oct. 10, 2023

(54) COVER STRUCTURE

(71) Applicant: SUZUKI MOTOR CORPORATION, Hamamatsu (JP)

(72) Inventors: Masatoshi Kimpara, Hamamatsu (JP); Shingo Matsumoto, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 17/669,305

(22) Filed: Feb. 10, 2022

(65) Prior Publication Data

US 2022/0260196 A1 Aug. 18, 2022

(30) Foreign Application Priority Data

Feb. 16, 2021 (JP) ................... 2021-022816

(51) Int. Cl.
*B63H 20/32* (2006.01)
*F16M 1/00* (2006.01)
*F02B 77/00* (2006.01)
*F02M 35/16* (2006.01)

(52) U.S. Cl.
CPC ............. *F16M 1/00* (2013.01); *F02B 77/00* (2013.01); *F02M 35/168* (2013.01)

(58) Field of Classification Search
CPC ........ F02B 61/045; F02B 77/00; B63H 20/32; B63H 21/36; F16M 1/00
See application file for complete search history.

(56) References Cited

U.S. PATENT DOCUMENTS

| | | | |
|---|---|---|---|
| 4,600,396 A | 7/1986 | Crane et al. | 440/77 |
| 4,952,180 A | 8/1990 | Watanabe et al. | 440/77 |
| 8,657,638 B1* | 2/2014 | Gonring | B63H 20/002 440/88 L |
| 9,180,950 B1* | 11/2015 | Davenport | B63H 20/32 |
| 9,365,277 B2* | 6/2016 | Skrzypchak | B63H 20/32 |
| 9,863,498 B1* | 1/2018 | Westhoff, Jr. | B60W 10/30 |
| 2004/0014379 A1* | 1/2004 | Yasuda | B63H 20/32 440/77 |
| 2004/0018785 A1* | 1/2004 | Yasuda | F02B 61/045 440/77 |
| 2014/0123931 A1* | 5/2014 | Mavinahally | F01M 9/06 123/196 R |
| 2016/0023740 A1* | 1/2016 | Skrzypchak | B63H 20/32 439/34 |
| 2020/0198748 A1* | 6/2020 | Wiegele | F01P 7/16 |

FOREIGN PATENT DOCUMENTS

JP H01162633 U * 11/1989
JP 2-63995 A 3/1990

* cited by examiner

*Primary Examiner* — George C Jin
*Assistant Examiner* — Teuta B Holbrook
(74) *Attorney, Agent, or Firm* — Stein IP, LLC (57) ABSTRACT

A cover structure of an upper unit in which a power source of an outboard motor is provided, the cover structure includes a main body cover including a pair of divided covers connected to each other, the pair of the divided covers being configured to be divided into each other in a left-right direction with respect to a traveling direction of a boat, and an attachable and detachable cover that is attachable to and detachable from a part of an outer surface of at least one of the pair of the divided covers.

6 Claims, 7 Drawing Sheets

COVER STRUCTURE

CROSS-REFERENCE TO RELATED APPLICATIONS

The disclosure of Japanese Patent Application No. 2021-022816 filed on Feb. 16, 2021, including specification, drawings and claims is incorporated herein by reference in its entirety.

BACKGROUND

The present invention relates to a cover structure of an upper unit in which a power source of an outboard motor is provided.

For example, Patent Literature 1 discloses an outboard motor including a top cowling or the like that can be divided into two in an upper-lower direction. In this outboard motor, for the purpose of increasing the degree of freedom in design of a position and an area of an intake port and blocking a sound transmitted upward from an engine, a molding is provided on an entire upper surface of the top cowling to form a double structure.

For example, Patent Literature 2 discloses an outboard motor including an upper unit that can be divided into two in a left-right direction.

Patent Literature 1: JP-A-H2-63995
Patent Literature 2: U.S. Pat. No. 4,600,396

SUMMARY

According to an aspect of the present disclosure, there is provided a cover structure of an upper unit in which a power source of an outboard motor is provided, the cover structure including: a main body cover including a pair of divided covers connected to each other, the pair of the divided covers being configured to be divided into each other in a left-right direction with respect to a traveling direction of a boat; and an attachable and detachable cover that is attachable to and detachable from a part of an outer surface of at least one of the pair of the divided covers.

BRIEF DESCRIPTION OF DRAWINGS

Exemplary embodiment(s) of the present invention will be described in detail based on the following figures, wherein.

DETAILED DESCRIPTION OF EXEMPLIFIED EMBODIMENTS

For example, in a small outboard motor often used for the purpose of leisure, there has been a request from a user to customize a cover of an upper unit, which is easily visible to a human eye, according to a preference thereof. As a manufacturer, manufacturing a plurality of types of upper units (covers) responds to the above-described user orientation. However, it is not realistic to manufacture a plurality of types of upper units (covers) since manufacturing cost increases and product management is complicated.

The small outboard motor for leisure may be removed from a boat when not in use, and may be placed on a ground (a floor surface) in a storage posture in which the outboard motor is laid sideways. In this case, a side surface of the upper unit (the cover) in contact with the ground may be scratched. When the outboard motor is mounted on a boat, a scratch on the side surface of the cover of the upper unit is conspicuous. Therefore, a structure has been required in which a damaged portion of the cover can be easily replaced.

In the outboard motor described in the above-described patent literature, customizing the cover according to the preference of the user or replacing the scratched cover is not sufficiently considered.

The above-described outboard motor cannot store tools required for simple maintenance. Therefore, it is necessary to carry a case or the like that stores the tools. Further, the above-described outboard motor does not have a space for storing small tools and the like used for fishing purposes such as a fishing hook, a fishing thread, and a small light.

The present invention has been made in view of the above-described problems, and an object of the present invention is to provide a cover structure that can replace a part.

According to the present invention, a part of the cover of the upper unit can be replaced.

A cover structure according to an embodiment of the present invention is a cover of an upper unit in which a power source of an outboard motor is provided. The cover structure includes a main body cover including a pair of divided covers connected to each other, the pair of divided covers being configured to be divided into each other in a left-right direction with respect to a traveling direction of a boat, and an attachable and detachable cover that is attachable to and detachable from a part of an outer surface of at least one of the pair of divided covers.

Since the attachable and detachable cover is attachable to and detachable from the divided cover, for example, a user can remove the present attachable and detachable cover and mount the attachable and detachable cover to which the favorite design for the user has been applied. Accordingly, since the design of a part of the upper unit can be easily changed, it is possible to respond to the desire of the user to customize the cover (design of the cover) of the upper unit. Since only the attachable and detachable cover is replaced, the cost related to the replacement (the design change) can be reduced as compared with the case in which an entire cover of the upper unit is replaced.

Hereinafter, a cover structure of an upper unit of an outboard motor according to an embodiment of the present invention will be described with reference to the drawings. In the description of the embodiment, upper (Ud), lower (Dd), front (Fd), rear (Bd), left (Ld), and right (Rd) directions are set based on upper, lower, front, rear, left, and right directions of an occupant who boards a boat to which the outboard motor is attached and who faces a traveling direction of the boat. These directions are indicated by arrows shown in the drawings.

Figure 1:
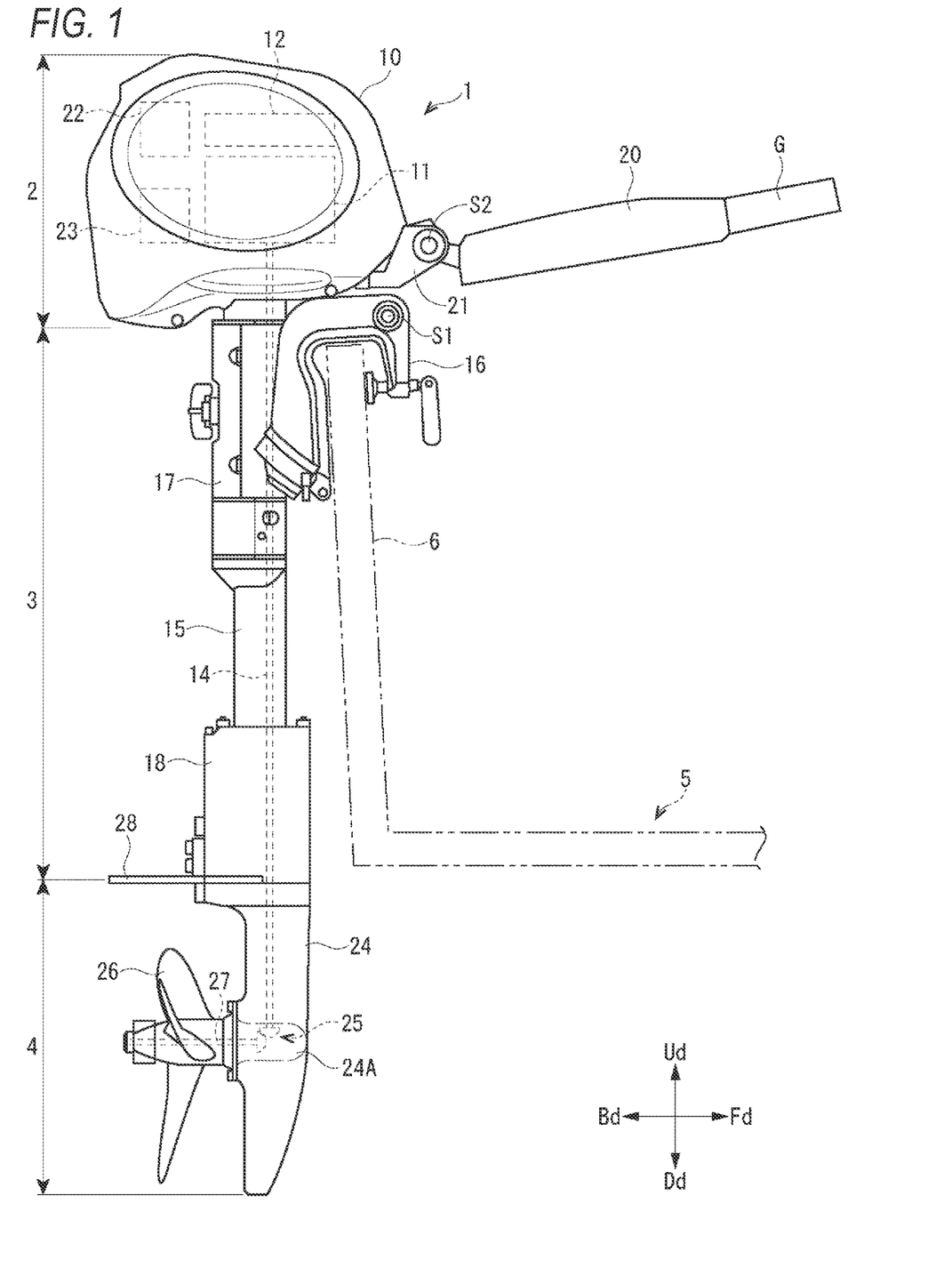
FIG. 1 is a right side view of an outboard motor according to an exemplary embodiment of the present invention.

The overall configuration of an outboard motor 1 will be described with reference to FIG. 1. FIG. 1 is a right side view showing the outboard motor 1.

The outboard motor 1 is a device that is attached to a transom board 6 of a boat 5 and is configured to propel the boat 5. The outboard motor 1 according to the present embodiment is an electric outboard motor 1 using an electric motor 11 as a power source, and is a small output outboard motor suitable for the small boat 5. In the description of the embodiment, as shown in FIG. 1, a term "traveling direction of the boat" used in the claims refers to a front direction in a state in which the outboard motor 1 is attached to the boat 5 and is in usage.

The outboard motor 1 includes an upper unit 2, a middle unit 3, and a lower unit 4. The upper unit 2 constitutes an upper portion of the outboard motor 1, and the upper unit 2 is provided with the electric motor 11 as an example of the power source. The lower unit 4 constitutes a lower portion of the outboard motor 1, and the lower unit 4 is provided with a propeller 26. The middle unit 3 is provided between the upper unit 2 and the lower unit 4.

Upper Unit

The upper unit 2 includes a motor cover 10, the electric motor 11, an inverter 12, and the like.

The motor cover 10 is a cover structure that covers the electric motor 11 and the inverter 12 and forms an external appearance of the upper unit 2. The motor cover 10 is formed in an egg shape as if a sphere is stretched in a front-rear direction (see also FIG. 2). As will be described in detail later, a part of the motor cover 10 has a double structure and is configured to be mounted to and removed from the motor cover 10.

The electric motor 11 and the inverter 12 are housed inside the motor cover 10. An upper end portion of a drive shaft 14 is connected to an output shall of the electric motor 11. The drive shaft 14 extends downward from the electric motor 11. The drive shaft 14 is rotated about an axis thereof by the power of the electric motor 11, and is configured to transmit the power of the electric motor 11 to the propeller 26. The inverter 12 is provided above the electric motor 11, and is configured to control the current for driving the electric motor 11. For example, in the case of the small output electric motor 11, the motor cover 10 may house a battery (not shown) such as a high-performance secondary battery that can be repeatedly used by being charged. The battery is electrically connected to the electric motor 11, the inverter 12, and the like, and supplies the electric power to the electric motor 11, the inverter 12, and the like. In general, the battery is provided outside the upper unit 2 (the motor cover 10), and is often connected to the electric motor 11 and the like via an external cable or the like.

Middle Unit

The middle unit 3 includes a drive shaft housing 15, a clamp bracket 16, a swivel bracket 17, and a heat sink 18.

Drive Shaft Housing

The drive shaft housing 15 is provided below the motor cover 10, and is formed in a substantially cylindrical shape that is long in an upper-lower direction. The drive shaft housing 15 includes the drive shaft 14.

Clamp Bracket

The clamp bracket 16 is provided to fix the outboard motor 1 to the transom board 6 of the boat 5. The clamp bracket 16 is formed into a substantially U shape that is inverted in the upper-lower direction as viewed from a side surface, covers the transom board 6 from above, and sandwiches the transom board 6. Although not clearly shown in FIG. 1, the clamp bracket 16 is formed into a shape of a pair of left and right arms in the plan view.

Swivel Bracket

The swivel bracket 17 is pivotably supported via a tilt shaft S1 provided at the pair of left and right arm portions of the clamp bracket 16. The outboard motor 1 is tilted (tilted up, tilted down) relative to the boat 5 by pivoting (swinging) the swivel bracket 17 in the upper-lower direction about the tilt shaft S1. The swivel bracket 17 surrounds the drive shaft housing 15, and supports the drive shaft housing 15 such that the drive shaft housing 15 can be pivoted about the axis of the drive shaft 14.

Handle

The outboard motor 1 is provided with a handle 20 that pivots (swings) the drive shaft housing 15. The handle 20 is attached to the front side of the drive shaft housing 15 via an attachment 21. A base end portion of the handle 20 is connected to the attachment 21 via a handle shaft S2 extending in the left-right direction, and the handle 20 is provided so as to be pivotable in the upper-lower direction about the handle shaft S2. A throttle grip G configured to allow the rotational speed of the electric motor 11 to be operated is provided at a tip end portion of the handle 20.

Heat Sink

The heat sink 18 constitutes, together with a cooling water passage (not shown), a tank 22 that stores the cooling water for a reservoir, and a pump 23, a cooling device configured to cool the electric motor 11 and the inverter 12. The heat sink 18 is formed in a tubular shape that is wider in the front-rear direction than the drive shaft housing 15, and is connected to a lower end of the drive shaft housing 15. The cooling water passage is provided inside the motor cover 10, the drive shaft housing 15, and the like so as to circulate the cooling water through the electric motor 11, the inverter 12, and the heat sink 18. The tank 22 and the pump 23 are provided inside the motor cover 10. The pump 23 is configured to circulate the cooling water flowing through the cooling water passage. The heat sink 18 is configured to cool the cooling water circulating in the cooling water passage. An example of the cooling water includes an antifreeze solution containing ethylene glycol as a main component.

Lower Unit

The lower unit 4 includes a gear case 24, a gear mechanism 25, and the propeller 26.

Gear Case

The gear case 24 is connected to a lower end of the heat sink 18. The gear case 24 has a shape in which a portion from an upper end portion of the gear case 24 to a gear mechanism housing portion 24A that houses the gear mechanism 25 is narrowed and tapered in the front view. A portion of the gear case 24 extending downward from the gear mechanism housing portion 24A is formed in a plate shape so as to function as a rudder. An anti-ventilation plate 28 extends rearward at a lower end portion of the above-described drive shaft housing 15, that is, in the vicinity of a boundary between the drive shaft housing 15 and the gear case 24. The anti-ventilation plate 28 prevents air from flowing from the water surface into the propeller 26.

Gear Mechanism

The gear mechanism 25 is housed in the gear mechanism housing portion 24A of the gear case 24. A lower side of the drive shaft 14 enters the gear case 24 and is connected to the gear mechanism 25. The gear mechanism 25 includes a propeller shaft 27 extending in the front-rear direction, and a rear portion of the propeller shaft 27 protrudes rearward from the gear case 24. The propeller 26 is attached to the rear portion of the propeller shaft 27. The gear mechanism 25 transmits the rotation of the drive shaft 14 about the axis to the propeller shaft 27 (the propeller 26). The propeller 26 is rotated about an axis underwater to generate a propulsive force for propelling the boat 5.

In many cases, the small outboard motor 1 is often used for the purpose of leisure, and there has been a request from a user to customize the motor cover 10 of the upper unit 2, which is easily visible to a human eye, according to a preference thereof. In order to meet this request, when a manufacturer manufactures a plurality of types of motor covers 10, another problem such as an increase in manufacturing cost and complicated product management occurs.

The small outboard motor 1 for leisure may be removed from the boat 5 when not in use, and may be placed on a ground GL (a floor surface) in a storage posture P (see FIG. 7 to be described later) in which the outboard motor 1 is laid sideways. The side surface of the motor cover 10 of the upper unit 2 in contact with the ground GL may be scratched. When the outboard motor 1 is mounted on the boat 5, a scratch on the outboard motor 1 is conspicuous. Therefore, a structure has been required in which a damaged portion of the motor cover 10 can be easily replaced.

Therefore, in the outboard motor 1 according to the present embodiment, a part of the motor cover 10 of the upper unit 2 is replaceable.

Structure of Motor Cover

Figure 2:
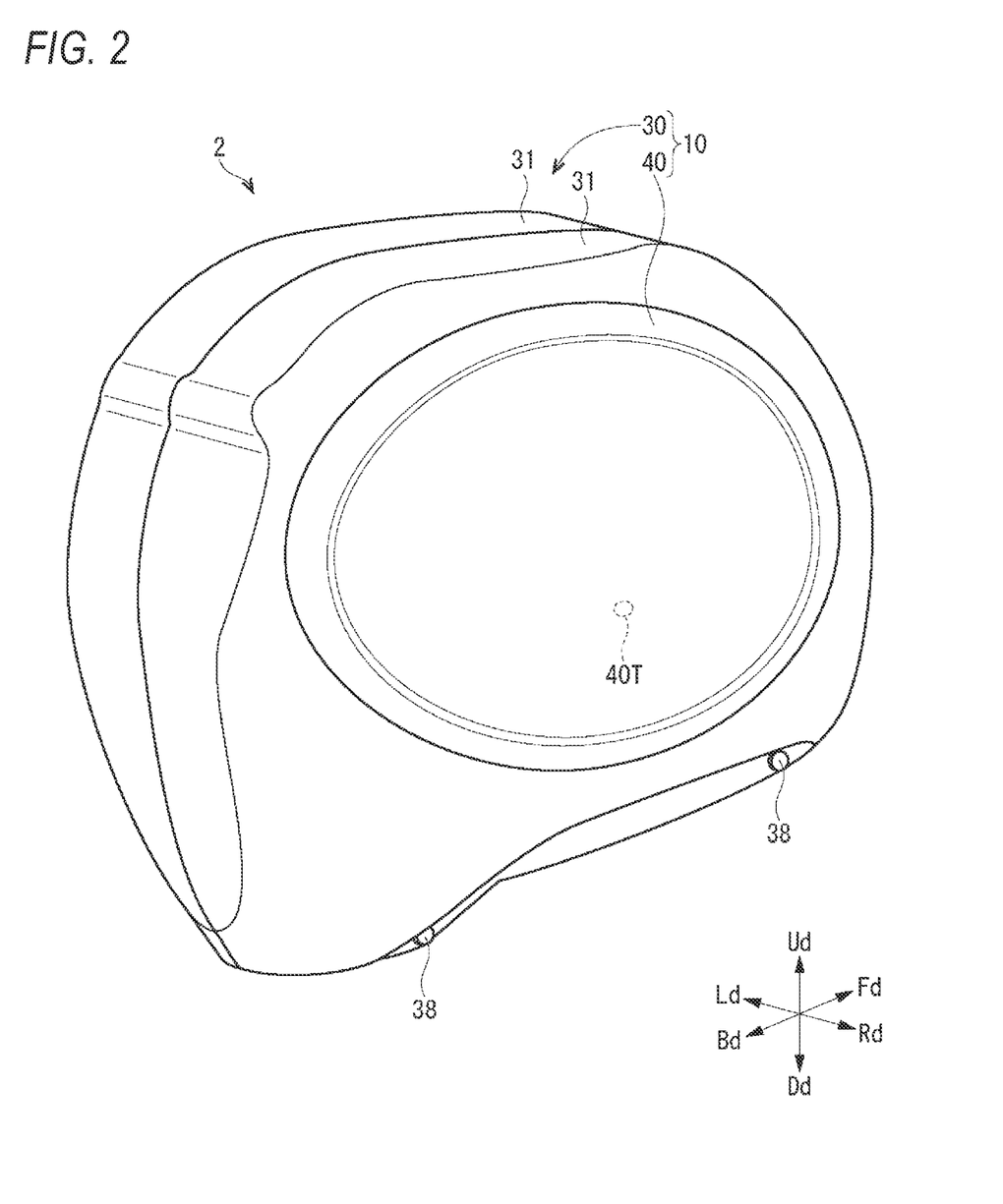
FIG. 2 is a perspective view showing a motor cover (a cover structure of an upper unit) of the outboard motor according to the exemplary embodiment of the present invention.
Figure 3:
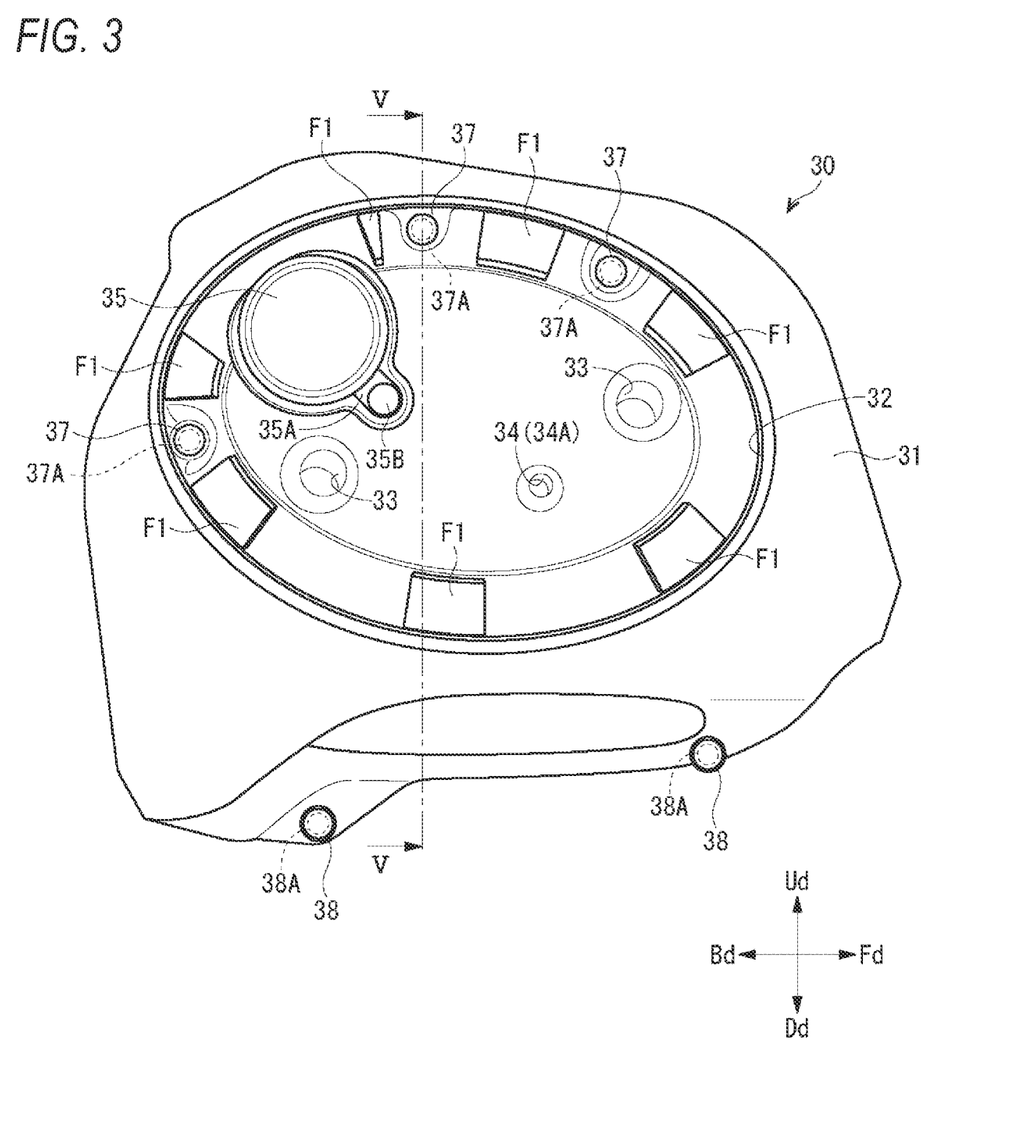
FIG. 3 is a right side view of a main body cover of the motor cover according to the exemplary embodiment of the present invention.
Figure 4:
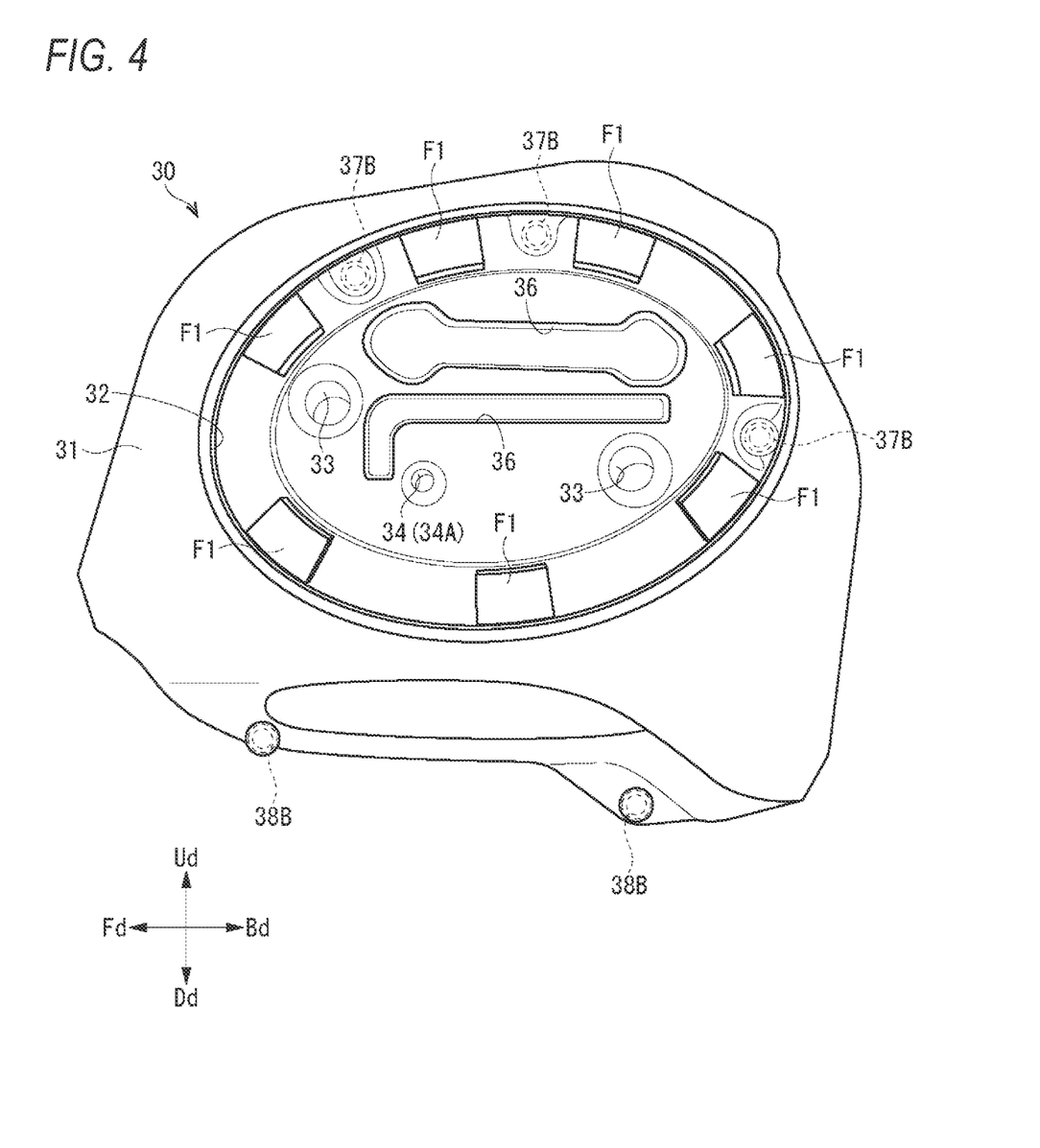
FIG. 4 is a left side view of the main body cover of the motor cover according to the exemplary embodiment of the present invention.
Figure 5:
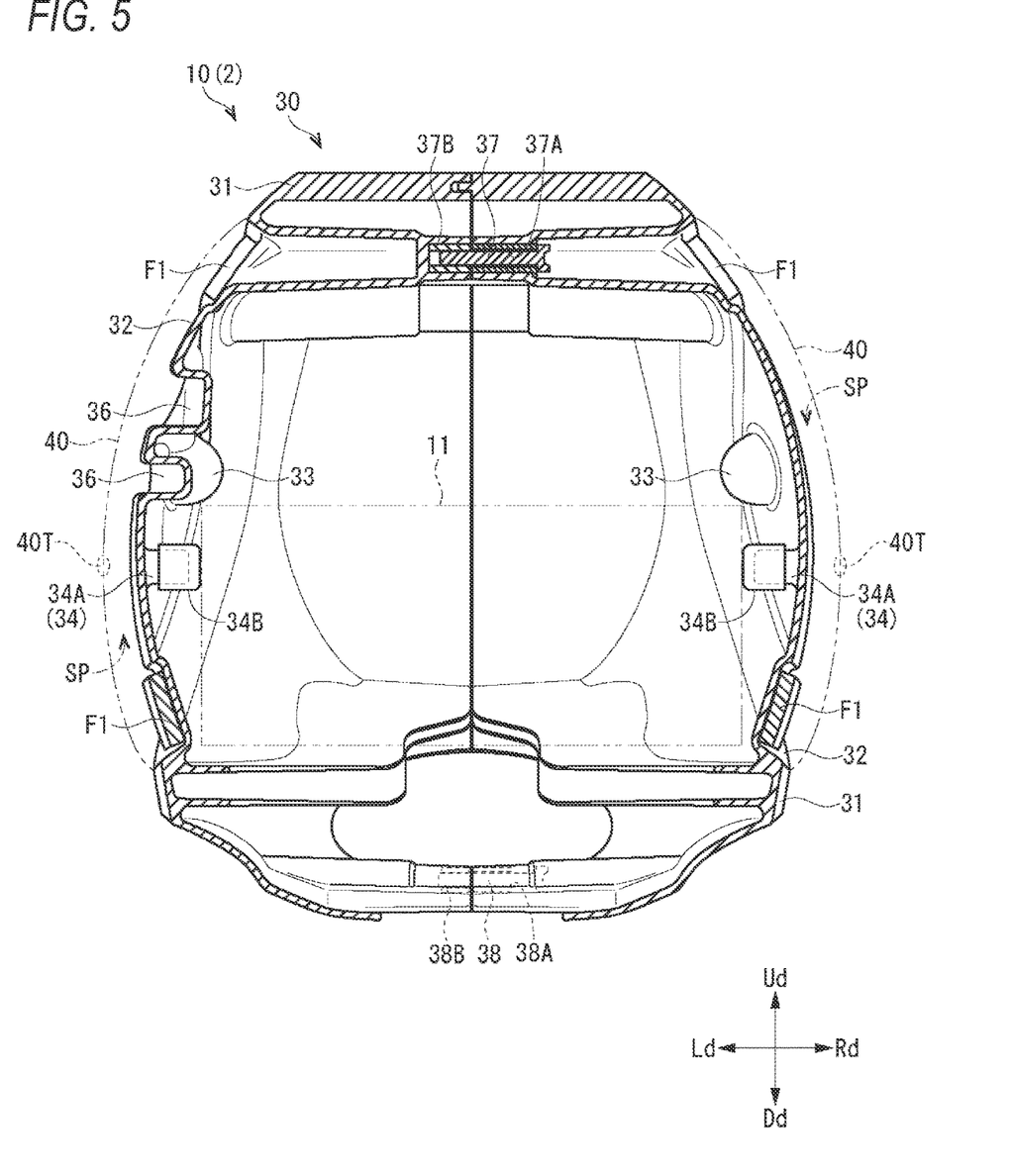
FIG. 5 is a cross-sectional view taken along V-V in FIG. 3.
Figure 6:
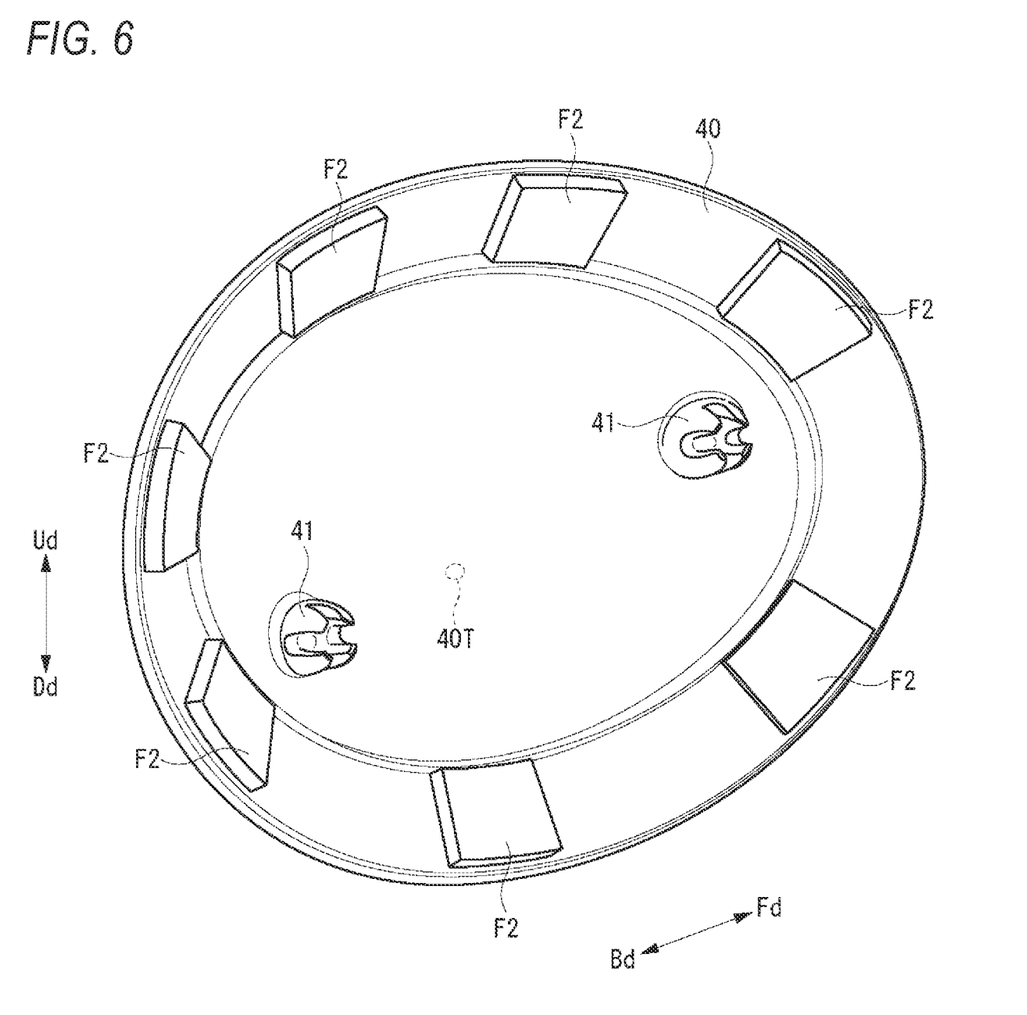
FIG. 6 is a perspective view showing an attachable and detachable cover of the motor cover according to the exemplary embodiment of the present invention.
Figure 7:
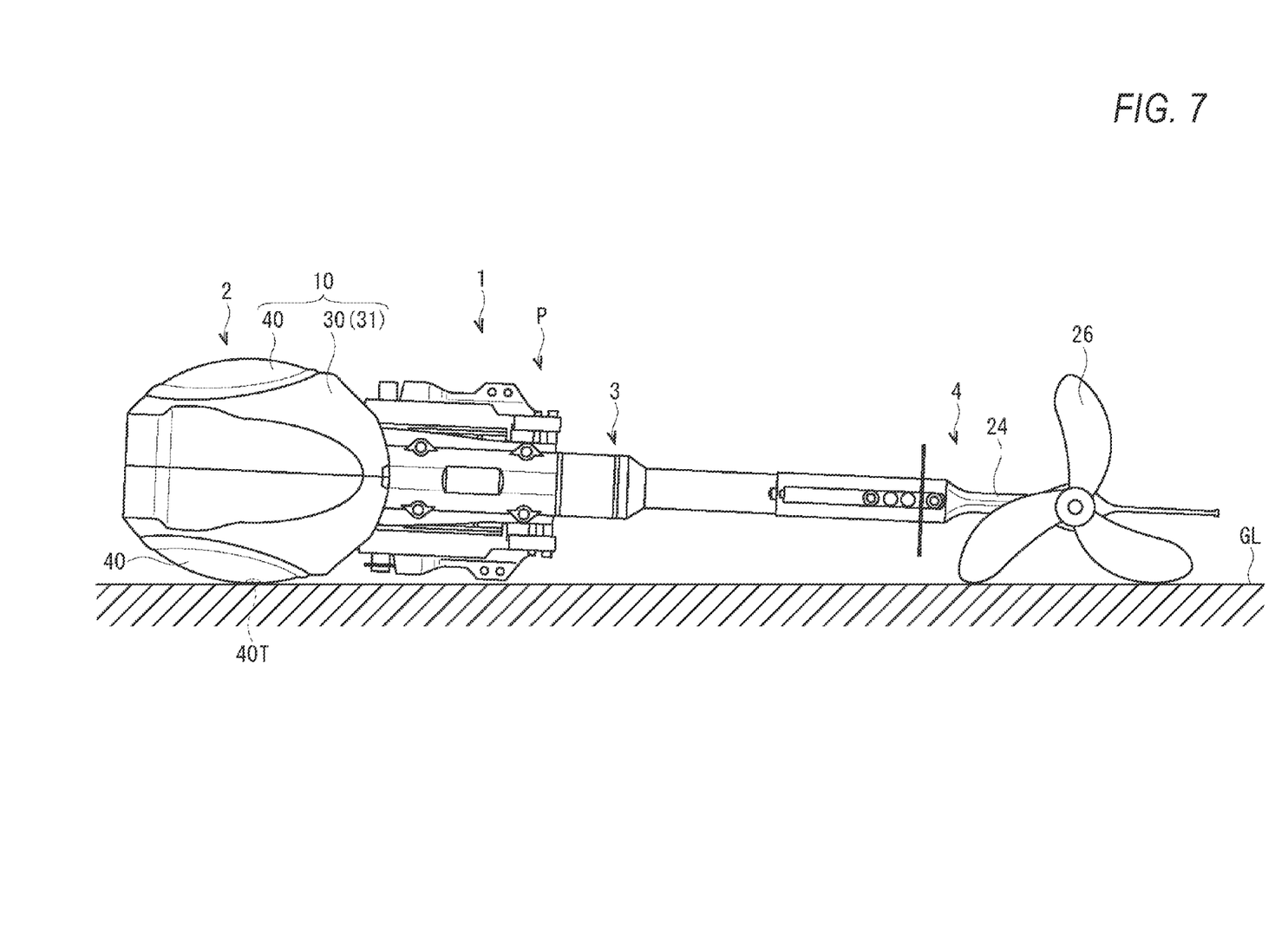
FIG. 7 is a side view showing a state in which the outboard motor according to the exemplary embodiment of the present invention is in a storage posture.

A structure (a cover structure of the upper unit 2) of the motor cover 10 will be described with reference to FIGS. 2 to 7. FIG. 2 is a perspective view showing the motor cover 10 (the cover structure of the upper unit 2). FIG. 3 is a right side view showing the main body cover 30 of the motor cover 10. FIG. 4 is a left side view of the main body cover 30 of the motor cover 10. FIG. 5 is a cross-sectional view taken along V-V in FIG. 3. FIG. 6 is a perspective view showing an attachable and detachable cover 40 of the motor cover 10. FIG. 7 is a side view showing a state in which the outboard motor 1 is in the storage posture P.

The motor cover 10 is formed of, for example, synthetic resin and is formed in an approximately egg shape (see FIG. 2). A rear lower portion of the motor cover 10 protrudes downward as compared with a front side portion of the motor cover 10 in a side view. A lower portion of the motor cover 10 has a shape that is narrowed in the left-right direction toward the lower side in a front view (a back view).

As shown in FIG. 2, the motor cover 10 (the cover structure) includes the main body cover 30 and the two attachable and detachable covers 40 (only a right side is shown in FIG. 2).

Main Body Cover

The main body cover 30 includes a pair of divided covers 31 that can be divided in the left-right direction with respect to the traveling direction of the boat 5. The main body cover 30 has a left-right divided structure, and is formed by connecting the pair of divided covers 31 that face each other in the left-right direction with the electric motor 11 interposed between the pair of divided covers 31.

Divided Cover

The pair of divided covers 31 are formed in a bathtub shape (a tray shape) in which surfaces facing each other are opened (see FIG. 5). As shown in FIGS. 3 to 5, a mounting recess 32 that allows the attachable and detachable cover 40 to be mounted is recessed in a part of an outer surface (an outer side surface) of each divided cover 31. The mounting recess 32 is formed in a substantially elliptical shape in a region including the center of the divided cover 31 in the side view. The pair of divided covers 31 have different portions. However, since the pair of divided covers 31 have substantially the same outer shape, the following description will focus on one divided cover 31 in the description common to the pair of divided covers 31.

As shown in FIGS. 3 and 4, a plurality of hook surface portions F1 of a hook-and-loop fastener that fixes the attachable and detachable cover 40, which will be described later, are fixed to the outer side surface of the divided cover 31 within a range of the mounting recess 32. The plurality of hook surface portions F1 are arranged at predetermined intervals along the contour of the elliptical shape of the mounting recess 32. The number of the hook surface portions F1 may be freely changed.

On an outer surface of the divided cover 31, a pair of positioning recesses 33 and a sideways laying recess 34 are recessed within the range of a mounting recess 32. The pair of positioning recesses 33 are substantially hemispherical recesses formed in a front upper portion and a rear lower portion of the mounting recess 32 in a side view (see also FIG. 5). As will be described in detail later, a pair of positioning protrusions 41 formed on the attachable and detachable cover 40 are fitted into the pair of positioning recesses 33. The sideways laying recess 34 is a substantially columnar recess formed in a slightly front lower portion (between the pair of positioning recesses 33) of the mounting recess 32 in the side view (see also FIG. 5). As shown in FIG. 5, the sideways laying recess 34 constitutes a sideways laying boss 34A protruding toward the inside of the divided cover 31. The sideways laying boss 34A is covered with a cushion member 34B formed of, for example, an elastic body such as synthetic rubber. In the state in which the main body cover 30 is formed by coupling the pair of divided covers 31, the pair of sideways laying bosses 34A abut against both side surfaces of the electric motor 11 in the left-right direction via the cushion member 34B.

Window Portion

As shown in FIG. 3, the right divided cover 31 is provided with a window portion 35 that allows the remaining amount of the cool water stored inside the main body cover 30, specifically, the tank 22 (see FIG. 1) to be visually observed. The window portion 35 is provided at a rear upper portion (above the positioning recess 33 at the rear lower portion) within the range of the mounting recess 32. The window portion 35 is formed of, for example, a transparent or translucent synthetic resin, glass, or the like in a substantial disk shape, and closes a substantially circular hole opened in the divided cover 31. The window portion 35 is fixed to the divided cover 31 via a screw 35B that penetrates a tip end portion of an arm portion 35A toward the outside in a radial direction.

Holding Portion

As shown in FIG. 4, two holding portions 36 that hold a simple maintenance tool (a predetermined article) are provided side by side in the upper-lower direction in the left divided cover 31. Each holding portion 36 is recessed so as to avoid the pair of positioning recesses 33 and the sideways laying recess 34 within the range of the mounting recess 32. The two holding portions 36 are, for example, recesses that form an outer shape of a spanner and a hexagonal wrench (not shown), and a tool such as a spanner or a hexagonal wrench is fitted and held in the holding portions 36.

As shown in FIG. 3, three first bolt holes 37A and two second bolt holes 38A are formed in the right divided cover 31. In terms of the three first bolt holes 37A, within the range of the mounting recess 32, two first bolt holes 37A are formed in an upper portion and one first bolt hole 37A is formed in a rear portion. The two second bolt holes 38A are formed in a lower portion (a constricted portion) of the divided cover 31, which is out of the range of the mounting recess 32, and are spaced apart from each other in the left-right direction. As shown in FIG. 4, three first insert nuts 37B and two second insert nuts 38B are embedded in the left divided cover 31. The first insert nuts 37B and the second nuts 38B are embedded so as to face the first bolt holes 37A and the second bolt holes 38A in a state in which the pair of divided covers 31 are connected (see FIG. 5).

As shown in FIG. 5, the pair of divided covers 31 are assembled so as to cover the electric motor 11 from both left and right sides. Specifically, a seal member (not shown) is sandwiched between joints of the pair of divided covers 31, first fastening members 37 are inserted into the first bolt holes 37A, and tip end portions of the first fastening members 37 are screwed into the first insert nuts 37B. Second fastening members 38 are inserted into the second bolt holes 38A, and tip end portions of the second fastening members 38 are screwed into the second insert nuts 38B. As described above, the pair of divided covers 31 are assembled by the three first fastening members 37 provided at a mounting position of the attachable and detachable cover 40 and the two second fastening members 38 provided at an exposed position below the mounting position of the attachable and detachable cover 40 (see also FIG. 3). Accordingly, the pair of divided covers 31 are connected to form the main body cover 30.

Attachable and Detachable Cover

The two attachable and detachable covers 40 are provided in a part of the outer surfaces (the outer side surfaces) of the pair of divided covers 31, and specifically are attachable to and detachable from the mounting recess 32 (see FIGS. 2 and 5). The two attachable and detachable covers 40 have different portions. However, since the two attachable and detachable covers 40 have substantially the same outer shape, in the following description, one attachable and detachable cover 40 will be described.

As shown in FIGS. 2 and 6, the attachable and detachable cover 40 is formed in a substantially elliptical shape in the side view so as to be fitted into the mounting recess 32 of the divided cover 31. The attachable and detachable cover 40 has a curved surface that bulges outward from the inside, and is formed in a substantial bowl shape having a small depth. A surface (an outer side surface) of the attachable and detachable cover 40 shown in FIG. 2 and the like does not show a pattern, a decoration, or the like. However, a pattern, a decoration, or the like may be applied to the attachable and detachable cover 40 according to the preference of the user.

As shown in FIG. 6, a plurality of loop surface portions F2 of the hook-and-loop fastener are fixed to an inner surface of the attachable and detachable cover 40. The plurality of loop surface portions F2 are arranged at predetermined intervals along the contour of the attachable and detachable cover 40. The plurality of loop surface portions F2 face the plurality of hook surface portions F1 provided in the divided cover 31 in a state in which the attachable and detachable cover 40 is fitted into the mounting recess 32. The pair of positioning protrusions 41 that can be fitted into the pair of positioning recesses 33 recessed in the divided cover 31 protrude from the inner surface of the attachable and detachable cover 40.

Mounting of Attachable and Detachable Cover

As shown in FIG. 5, the attachable and detachable cover 40 is mounted with a storage space SP formed between the detachable cover 40 and the divided cover 31. The storage space SP is a gap (a space) formed between the detachable cover 40 and the divided cover 31 in a state in which the attachable and detachable cover 40 is mounted on the main body cover 30. In the storage space SP, for example, small tools and the like used for fishing purposes such as a fishing hook, a fishing thread, and a small light can be stored.

The procedure for mounting the attachable and detachable cover 40 to the main body cover 30 will be described. The user (the operator) fits the attachable and detachable cover 40 into the mounting recess 32 of the main body cover 30 (the divided cover 31). In a case in which the small tool is desired to be stored in the storage space SP, the small tool is provided in the mounting recess 32 before the attachable and detachable cover 40 is fitted. In the process of fitting the attachable and detachable cover 40 into the mounting recess 32, the pair of positioning protrusions 41 (see FIG. 6) protruding from the attachable and detachable cover 40 enters the pair of positioning recesses 33 (see FIGS. 3 and 4) recessed in the divided cover 31, and guides the mounting of the attachable and detachable cover 40 to the mounting recess 32. Accordingly, the user can smoothly fit the attachable and detachable cover 40 into the mounting recess 32.

When the attachable and detachable cover 40 is fitted into the mounting recess 32, a loop surface portion F2 (see FIG. 6) of the detachable cover 40 is attached to a hook surface portion F1 (see FIGS. 3 and 4) of the divided cover 31. Accordingly, the attachable and detachable cover 40 is held in a state of being mounted on the main body cover 30 (the mounting of the attachable and detachable cover 40 is completed).

As shown in FIGS. 2 and 5, the attachable and detachable cover 40 includes a portion that is a top portion 40T of the outboard motor 1 in the left-right direction in a state in which the attachable and detachable cover 40 is mounted on the main body cover 30. That is, in the outboard motor 1, the motor cover 10 (the upper unit 2) protrudes most in the left-right direction, and the top portions 40T of the curved surfaces of the pair of left and right attachable and detachable covers 40 are located on the outermost sides in the left-right direction. The top portion 40T may be set at any position. However, for example, it is preferable that the top portion 40T faces the sideways laying recess 34 (the sideways laying boss 34A) in a state in which the attachable and detachable cover 40 is mounted on the main body cover 30 (see FIG. 5). The top portion 40T may be regarded as a vertex, and may be regarded as a surface having a predetermined range.

As described above, as shown in FIG. 7, the outboard motor 1 when not in use is removed from the boat 5 and is placed on the ground GL in the storage posture P in which the outboard motor 1 is laid sideways. In the outboard motor 1 in the storage posture P, the propeller 26 (a gear case 24 and the like) and a top portion 40T of the attachable and detachable cover 40 are in contact with the ground GL. A weight (a load) of the electric motor 11 or the like is applied to the lower attachable and detachable cover 40 in contact with the ground GL, and the load is supported by the electric motor 11 via the sideways laying boss 34A of the main body cover 30 (the divided cover 31) (see FIG. 5). The cushion member 34B overlaid on the sideways laying boss 34A cushions the load applied to the main body cover 30 and the attachable and detachable cover 40 (or the electric motor 11).

Separation of Attachable and Detachable Cover

Next, a procedure for separating the attachable and detachable cover 40 from the main body cover 30 will be described. The user (the operator) hooks the finger thereof on the edge of the attachable and detachable cover 40 and pulls the attachable and detachable cover 40 outward in the left-right direction. Each loop surface portion F2 of the attachable and detachable cover 40 is peeled from a respective one of the hook surface portions F1 of the divided covers 31, and the attachable and detachable cover 40 is separated from the main body cover 30.

By removing the attachable and detachable cover 40, the small tools stored in the storage space SP can be taken out. By removing the right attachable and detachable cover 40, a window portion 35 is exposed, and the user can check the remaining amount of cooling water through the window portion 35. By removing the left attachable and detachable cover 40, the tool held by a holding portion 36 is exposed, and the user can perform simple maintenance using the tool.

According to the above-described motor cover 10 (the cover structure of the upper unit 2) in the present embodiment, the attachable and detachable cover 40 can be attached to and detached from the divided cover 31. Therefore, for example, the user can remove the present attachable and detachable cover 40 and mount the attachable and detachable cover 40 to which the favorite design for the user has been applied. Accordingly, since the design of a part of the upper unit 2 can be easily changed, it is possible to respond to the desire of the user to customize the motor cover 10 (design of the motor cover 10). Since only the attachable and detachable cover 40 is replaced, the cost related to the replacement (the design change) can be reduced as compared with the case in which the entire motor cover 10 is replaced.

In the motor cover 10 according to the present embodiment, the attachable and detachable cover 40 mounted on the main body cover 30 includes the top portion 40T of the outboard motor 1 in the left-right direction. When the outboard motor 1 is set to the storage posture P, the top portion 40T of the attachable and detachable cover 40 comes into contact with the ground GL (see FIG. 7). Therefore, the attachable and detachable cover 40 is likely to be scratched. In terms of this problem, according to the motor cover 10 in the present embodiment, since the attachable and detachable cover 40 is attachable and detachable, the scratched attachable and detachable cover 40 can be easily replaced with the attachable and detachable cover 40 without being scratched.

The outboard motor 1 may be set to the storage posture P in a state (not shown) in which the attachable and detachable cover 40 is removed. In this case, since a top portion (for example, the portion corresponding to the sideways laying boss 34A) present within the range of the mounting recess 32 of the main body cover 30 (the divided cover 31) comes into contact with the ground GL, the divided cover 31 may be scratched. However, the scratch on the divided cover 31 can be hidden by mounting the attachable and detachable cover 40.

Further, in the motor cover 10 according to the present embodiment, the first fastening member 37 used to assemble the pair of divided covers 31 is provided in the mounting recess 32, and the second fastening member 38 is provided at a position separated downward from the mounting recess 32 (see FIG. 3). According to this configuration, the first fastening member 37 can be covered with the attachable and detachable cover 40, and the second fastening member 38 can be provided at an inconspicuous position of the lower portion of the upper unit 2. Accordingly, the first fastening member 37 and the second fastening member 38 are not conspicuous in the state in which the divided cover 31 is assembled, and the appearance of the upper unit 2 can be improved.

According to the motor cover 10 in the present embodiment, the storage space SP is formed between the divided cover 31 and the attachable and detachable cover 40. Therefore, for example, small tools and the like used for fishing purposes such as a fishing hook, a fishing thread, and a small light can be stored in the storage space SP.

According to the motor cover 10 in the present embodiment, by removing the right attachable and detachable cover 40, the window portion 35 is exposed, and the remaining amount of the cooling water can be easily inspected through the window portion 35. Since the tool can be held by the holding portion 36, it is not necessary to carry a case or the like in which the tool is stored, and it is possible to easily perform simple maintenance using the tool held by the holding portion 36.

The outboard motor 1 according to the present embodiment is divided into three portions which are the upper unit 2, the middle unit 3, and the lower unit 4. However, the present invention is not limited thereto. For example, the middle unit 3 may be regarded as a part of the lower unit 4, and the outboard motor may be implemented by two upper and lower units (the upper unit 2 and the lower unit 4) (not shown).

The outboard motor 1 according to the present embodiment uses the electric motor 11 as the power source. However, instead of the electric motor 11, a small internal combustion engine (for example, an internal combustion engine in which exhaust gas is open to the atmosphere) may be used as the power source, or a hybrid power source in which the electric motor 11 and the internal combustion engine are combined may be provided (none of the small internal combustion engine and the hybrid power source is shown).

In the motor cover 10 (the cover structure of the upper unit 2) according to the present embodiment, the attachable and detachable cover 40 is provided on each of the pair of divided covers 31. However, the present invention is not limited thereto. For example, the attachable and detachable cover 40 may be attachable to and detachable from a part of the outer surface of at least one of the pair of divided covers 31. The attachable and detachable cover 40 is provided in the central region of the divided cover 31 in the side view. However, the present invention is not limited thereto. The attachable and detachable cover 40 may be provided at a position shifted from the central region of the divided cover 31 in a front-rear direction or an upper-lower direction (not shown).

In the motor cover 10 according to the present embodiment, the attachable and detachable cover 40 is formed in a bowl shape having a curved surface. However, the present invention is not limited thereto. The attachable and detachable cover 40 may have, for example, a columnar shape or a cone shape having a circular or polygonal bottom surface (not shown). That is, the attachable and detachable cover 40 may have any shape as long as the attachable and detachable cover 40 has a shape in which the top portion 40T is provided and the storage space SP can be formed between the attachable and detachable cover 40 and the divided cover 31.

In the motor cover 10 according to the present embodiment, the storage space SP is formed between the attachable and detachable cover 40 and the divided cover 31. However, the present invention is not limited thereto. For example, the storage space SP may be omitted, and the attachable and detachable cover 40 may be mounted in a state of being in contact with the divided cover 31 without interposing the storage space SP (not shown).

In the motor cover 10 according to the present embodiment, the pair of divided covers 31 are assembled by the three first fastening members 37 and the two second fastening members 38. However, the present invention is not limited thereto. The pair of divided covers 31 may be assembled by at least one first fastening member 37 and at least one second fastening member 38.

In the motor cover 10 according to the present embodiment, the hook surface portion F1 of the hook-and-loop fastener is fixed to the divided cover 31, and the loop surface portion F2 of the hook-and-loop fastener is fixed to the attachable and detachable cover 40. However, the present invention is not limited thereto. The loop surface portion F2 may be fixed to the divided cover 31, and the hook surface portion F1 may be fixed to the attachable and detachable cover 40 (not shown).

In the motor cover 10 according to the present embodiment, the hook-and-loop fastener is used as a portion that allows the attachable and detachable cover 40 to be mounted on the divided cover 31. However, the present invention is not limited thereto. As another mounting portion, for example, a snap lock (a fastener) may be used that performs locking by hooking and tilting a lever provided on one of the divided cover 31 and the attachable and detachable cover 40 by a protrusion provided on the other of the divided cover 31 and the attachable and detachable cover 40 (not shown). As another mounting portion, for example, a claw-shaped hook may be provided on one of the divided cover 31 and the attachable and detachable cover 40, and a recess for locking the hook may be formed on the other of the divided cover 31 and the attachable and detachable cover 40 (not shown). Further, as another mounting portion, a magnet may be used (not shown). The various mounting portions described above may be combined (not shown).

In the motor cover 10 according to the present embodiment, the window portion 35 is provided in order to check the remaining amount of the cooling water. However, the present invention is not limited thereto. For example, when an internal combustion engine is used as the power source, the window portion 35 may be provided in order to check the amount of oil.

In the motor cover 10 according to the present embodiment, the window portion 35 is provided on the right divided cover 31, and the holding portion 36 is provided on the left divided cover 31. However, the present invention is not limited thereto. For example, conversely, the holding portion 36 may be provided on the right divided cover 31, and the window portion 35 may be provided on the left divided cover 31 (not shown). In addition, at least one of the window portion 35 and the holding portion 36 may be provided on the divided covers 31 on both sides, or the window portion 35 and the holding portion 36 may be omitted (not shown).

In the motor cover 10 according to the present embodiment, the two holding portions 36 are provided. However, at least one holding portion 36 may be provided. The holding portion 36 is a recess conforming to the shape of the tool. However, the present invention is not limited thereto. The holding portion 36 may be, for example, a hook that is hooked to a part of the tool (not shown). The tool serving as an example of the predetermined article is held in the holding portion 36. However, the present invention is not limited thereto. A replacement component or the like serving as another example of the article may be held by the holding portion 36 (not shown).

The present invention can be modified as appropriate without departing from the scope or spirit of the invention which can be read from the claims and the entire specification, and the outboard motor accompanying this modification is also included in the technical concept of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A cover structure of an upper unit in which a power source of an outboard motor is provided, the cover structure comprising:
   a main body cover including a pair of divided covers connected to each other, the pair of the divided covers being configured to be divided into each other in a left-right direction with respect to a traveling direction of a boat;
   an attachable and detachable cover that is attachable to and detachable from a part of an outer surface of at least one of the pair of the divided covers,
   wherein the pair of the divided covers are assembled by at least one first fastening member, the at least one first fastening member being provided at a position covered by the attachable and detachable cover and fastening the pair of the divided covers to each other, and,
   wherein the attachable and detachable cover is located on the outermost sides in the left-right direction.

2. The cover structure according to claim 1,
   wherein the attachable and detachable cover includes, in a state of being mounted on the main body cover, a portion that is a top portion of the outboard motor in the left-right direction.

3. A cover structure of an upper unit in which a power source of an outboard motor is provided, the cover structure comprising:
   a main body cover including a pair of divided covers connected to each other, the pair of the divided covers being configured to be divided into each other in a left-right direction with respect to a traveling direction of a boat;
   an attachable and detachable cover that is attachable to and detachable from a part of an outer surface of at least one of the pair of the divided covers,
   wherein the attachable and detachable cover is mounted on the part of the outer surface of the at least one of the pair of the divided covers so as to form a storage space between the attachable and detachable cover and the divided cover; and,
   wherein the attachable and detachable cover is located on the outermost sides in the left-right direction.

4. The cover structure according to claim 3,
   wherein the attachable and detachable cover includes, in a state of being mounted on the main body cover, a portion that is a top portion of the outboard motor in the left-right direction.

5. A cover structure of an upper unit in which a power source of an outboard motor is provided, the cover structure comprising:

a main body cover including a pair of divided covers connected to each other, the pair of the divided covers being configured to be divided into each other in a left-right direction with respect to a traveling direction of a boat;

an attachable and detachable cover that is attachable to and detachable from a part of an outer surface of at least one of the pair of the divided covers, wherein the at least one of the pair of the divided covers is provided with at least one of a window portion so that an inner side of the main body cover is visually recognized and a holding portion configured to hold a predetermined article, in a position covered by the attachable and detachable cover, and, wherein the attachable and detachable cover is located on the outermost sides in the left-right direction.

6. The cover structure according to claim 5, wherein the attachable and detachable cover includes, in a state of being mounted on the main body cover, a portion that is a top portion of the outboard motor in the left-right direction.

\* \* \* \* \*